Patented Apr. 6, 1926.

1,580,053

UNITED STATES PATENT OFFICE.

WALTHER KROPP AND WILHELM SCHRANZ, OF ELBERFELD, AND WERNER SCHULEMANN, OF VOHWINKEL, GERMANY, ASSIGNORS TO FARBENFABRIKEN VORM. FRIEDR. BAYER AND CO., OF LEVERKUSEN, NEAR COLOGNE-ON-THE-RHINE, GERMANY.

ORTHOBENZYLPHENOL AND PROCESS OF PREPARING THE SAME.

No Drawing.     Application filed February 1, 1924. Serial No. 690,073.

*To all whom it may concern:*

Be it known that we, WALTHER KROPP, WILHELM SCHRANZ, and WERNER SCHULEMANN, citizens of Germany, residing at Elberfeld (KROPP and SCHRANZ) and Vohwinkel, respectively, in the State of Prussia, Germany, have invented new and useful Improvements in Orthobenzylphenol and Process of Preparing the Same, of which the following is a specification.

Our invention relates to the manufacture and production of the hitherto unknown ortho-benzylphenol having most probably the following formula:

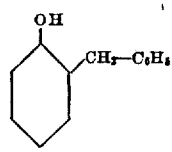

which crystallizes from benzene in the shape of crystals melting at 52° C., which are soluble in dilute alkalies forming alkali metal salts and being soluble in alcohol.

Our new product is obtained by firstly treating phenol with benzyl chloride, secondly treating the resulting mixture of ortho- and para-benzylphenol with a solution of barium hydroxide, thirdly heating this mixture, filtering the cooled liquid and finally separating the ortho-benzylphenol from the filtrate by acidulation.

Our new product is a valuable anthelmintic remedy which does not irritate the mucous membranes.

*Example.*—Sixty-five parts by weight of crystallized barium hydroxide and 250 parts by weight of water are heated to boiling, 50 parts by weight of the product of the reaction of benzylchloride upon phenol are added and the mixture is boiled during ten minutes. After cooling it is filtered and from the filtrate the ortho-benzylphenol is precipitated with hydrochloric acid.

We claim:—

The herein described process for producing ortho-benzylphenol, which process consists in firstly treating phenol with benzylhalide, secondly treating the resulting mixture comprising ortho and para-benzylphenol with a solution of barium hydroxide, thirdly heating this mixture, filtering the cooled liquid and finally separating the ortho-benzylphenol from the filtrate by acidulation, substantially as described.

In testimony whereof we have hereunto set our hands.

WALTHER KROPP.
WILHELM SCHRANZ.
WERNER SCHULEMANN.

Patented Apr. 6, 1926.

1,580,053

UNITED STATES PATENT OFFICE.

WALTHER KROPP AND WILHELM SCHRANZ, OF ELBERFELD, AND WERNER SCHULEMANN, OF VOHWINKEL, GERMANY, ASSIGNORS TO FARBENFABRIKEN VORM. FRIEDR. BAYER AND CO., OF LEVERKUSEN, NEAR COLOGNE-ON-THE-RHINE, GERMANY.

ORTHOBENZYLPHENOL AND PROCESS OF PREPARING THE SAME.

No Drawing. Application filed February 1, 1924. Serial No. 690,073.

*To all whom it may concern:*

Be it known that we, WALTHER KROPP, WILHELM SCHRANZ, and WERNER SCHULEMANN, citizens of Germany, residing at Elberfeld (KROPP and SCHRANZ) and Vohwinkel, respectively, in the State of Prussia, Germany, have invented new and useful Improvements in Orthobenzylphenol and Process of Preparing the Same, of which the following is a specification.

Our invention relates to the manufacture and production of the hitherto unknown ortho-benzylphenol having most probably the following formula:

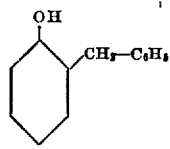

which crystallizes from benzene in the shape of crystals melting at 52° C., which are soluble in dilute alkalies forming alkali metal salts and being soluble in alcohol.

Our new product is obtained by firstly treating phenol with benzyl chloride, secondly treating the resulting mixture of ortho- and para-benzylphenol with a solution of barium hydroxide, thirdly heating this mixture, filtering the cooled liquid and finally separating the ortho-benzylphenol from the filtrate by acidulation.

Our new product is a valuable anthelmintic remedy which does not irritate the mucous membranes.

*Example.*—Sixty-five parts by weight of crystallized barium hydroxide and 250 parts by weight of water are heated to boiling, 50 parts by weight of the product of the reaction of benzylchloride upon phenol are added and the mixture is boiled during ten minutes. After cooling it is filtered and from the filtrate the ortho-benzylphenol is precipitated with hydrochloric acid.

We claim:—

The herein described process for producing ortho-benzylphenol, which process consists in firstly treating phenol with benzylhalide, secondly treating the resulting mixture comprising ortho and para-benzylphenol with a solution of barium hydroxide, thirdly heating this mixture, filtering the cooled liquid and finally separating the ortho-benzylphenol from the filtrate by acidulation, substantially as described.

In testimony whereof we have hereunto set our hands.

WALTHER KROPP.
WILHELM SCHRANZ.
WERNER SCHULEMANN.

Certificate of Correction.

It is hereby certified that Letters Patent No. 1,580,053, granted April 6, 1926, upon the application of Walter Kropp and Wilhelm Schranz, of Elberfeld, and Werner Schulemann, of Vohwinkel, Germany, for an improvement in "Orthobenzylphenol and Processes of Preparing the Same," were erroneously issued to "Farbenfabriken vorm. Friedr. Bayer and Co., of Leverkusen, near Cologne-on-the Rhine, Germany," whereas said Letters Patent should have issued to *Winthrop Chemical Company, Inc., of New York, N. Y., a Corporation of New York,* said corporation being assignee, by *mesne assignments,* of the entire interest in said invention, as shown by the records of assignments in this office; and that the said Letters Patent should be read with this correction therein that the same may conform to the record of the case in the Patent Office.

Signed and sealed this 29th day of June, A. D. 1926.

[SEAL.]

M. J. MOORE,
*Acting Commissioner of Patents.*

Certificate of Correction.

It is hereby certified that Letters Patent No. 1,580,053, granted April 6, 1926, upon the application of Walter Kropp and Wilhelm Schranz, of Elberfeld, and Werner Schulemann, of Vohwinkel, Germany, for an improvement in "Orthobenzylphenol and Processes of Preparing the Same," were erroneously issued to "Farbenfabriken vorm. Friedr. Bayer and Co., of Leverkusen, near Cologne-on-the Rhine, Germany," whereas said Letters Patent should have issued to *Winthrop Chemical Company, Inc., of New York, N. Y., a Corporation of New York*, said corporation being assignee, by *mesne assignments*, of the entire interest in said invention, as shown by the records of assignments in this office; and that the said Letters Patent should be read with this correction therein that the same may conform to the record of the case in the Patent Office.

Signed and sealed this 29th day of June, A. D. 1926.

[SEAL.]

M. J. MOORE,
*Acting Commissioner of Patents.*